UNITED STATES PATENT OFFICE.

HARRY H. PIERCE, OF TOLEDO, OHIO, ASSIGNOR, BY MESNE ASSIGNMENTS, TO THE H. H. PIERCE COMPANY, OF SAME PLACE.

PROCESS OF TREATING LIME.

SPECIFICATION forming part of Letters Patent No. 543,452, dated July 23, 1895.

Application filed June 6, 1894. Serial No. 513,654. (No specimens.)

*To all whom it may concern:*

Be it known that I, HARRY H. PIERCE, a citizen of the United States, residing at Toledo, Lucas county, Ohio, have invented a certain new and useful Process for the Treatment of Lime and a New and Useful Article of Manufacture, the Product of Such Process, of which the following is a specification.

The familiar objections and difficulties encountered in the storage, transportation, and use of common quicklime are its tendency to slake, heat, swell, and shrink, these changes frequently occurring after the lime is mixed and used with plaster and mortar, causing walls and ceilings to crack and chip off.

My invention relates to and its object is to produce lime which shall obviate the difficulties and objections here pointed out.

In practicing my invention common quicklime is first slaked to a putty, which should then be screened to remove foreign substances and bits of hard or unslaked lime. This putty is then run into pans, kettles, or other vessels, or if the putty be thick enough is molded into bricks or other convenient form and is then baked, roasted, or dried by applying heat at about 300° Fahrenheit. Heat may be applied in any preferred manner, but I find that to place the vessels containing the putty upon racks in a suitable room or oven and then to apply a hot-air blast is quite satisfactory, as by this method the product is kept white and unstained by contact with smoke or flame. Five hours of exposure of the putty to this temperature will be usually found sufficient, the time of exposure to heat depending somewhat upon the amount of water present in the putty. The degree of heat above mentioned is approximate and may be varied without affecting the results of my process, but great care should be taken not to subject the lime under treatment to a red heat or to such heat as will recalcine the lime, as such a temperature will reconvert the mass to a quicklime and will totally defeat the object of my invention. It should be also understood that the mere drying of the putty or evaporating its moisture in the open air is not sufficient for the purposes of my invention, as my process can only be practiced by the application of a proper degree of artificial heat. When the putty has been baked or roasted, as above described, it becomes hard and white and of uniform structure and must now, as the last step of my process, be ground or otherwise pulverized to the desired fineness. The lime is now ready for use.

The substance thus produced may be kept indefinitely without air-slaking; will not slake, heat, swell, or change; retains its setting qualities; is always ready for use, and may be advantageously applied to any of the purposes for which lime is commonly used and especially in plasters and mortars.

What I claim as my invention, and desire to secure by Letters Patent, is—

1. The herein described process of treating lime, which consists in, first, slaking quicklime to a putty; second, roasting said putty, and, third, grinding the hard mass thus obtained, substantially as and for the purpose specified.

2. As an article of manufacture, lime which as quick-lime has been slaked to a putty, then roasted and then ground, and which will not slake, heat nor swell, substantially as and for the purpose specified.

HARRY H. PIERCE.

Witnesses:
I. N. HUNTSBERGER,
L. E. BROWN.